Feb. 25, 1958 W. R. SHAVER 2,824,339
BOX CAR SIDE DOOR, BUMPER AND GUIDE
Filed Jan. 26, 1954 3 Sheets-Sheet 1

Inventor.
William R. Shaver.
By Wayne Morris Russell
Atty.

Feb. 25, 1958 W. R. SHAVER 2,824,339
BOX CAR SIDE DOOR, BUMPER AND GUIDE
Filed Jan. 26, 1954 3 Sheets-Sheet 3

Inventor.
William R. Shaver.
By Wayne Morris Russell
Atty.

United States Patent Office 2,824,339
Patented Feb. 25, 1958

2,824,339

BOX CAR SIDE DOOR, BUMPER, AND GUIDE

William R. Shaver, Highland, Ind., assignor to Pullman-Standard Car Manufacturing Company, Chicago, Ill., a corporation of Delaware Application January 26, 1954, Serial No. 406,119

10 Claims. (Cl. 20—22)

This invention relates to freight car doors and more particularly to a bumper and guide adapted to be used with such sliding doors.

In line with constant efforts to improve the efficiency of freight car doors by making them slide easier and by decreasing the amount of constant vibration transmitted thereto, the applicant has conceived an integral bumper and guide unit having novelty and utility over the present day arrangements.

Thus, it is a principal object of this invention to provide a bumper and guide unit which aids in the prevention of vibrations being transmitted to a sliding railway car door whether the door is completely open or completely shut.

Another object of this invention is to provide a bumper and guide unit which centers a railway car door on the door track when the door is completely open, thereby helping easy door sliding when initially starting to close the door, by insuring that the door will not be dragging on the guide surface.

And a further object of this invention is to provide an improved bumper and guide unit for use with a freight car sliding door which unit is rugged, economically manufactured, and easily serviced.

These and other objects will be apparent from the following description and drawings wherein:

Fig. 5 is a sectional view on the line 5—5 of Fig. 1;

Fig. 6 is a perspective view of the bumper and guide unit engaging a lower portion of the door rear edge; and Fig. 7 is a perspective view of the stop for the bumper and guide unit.

Figure 1:
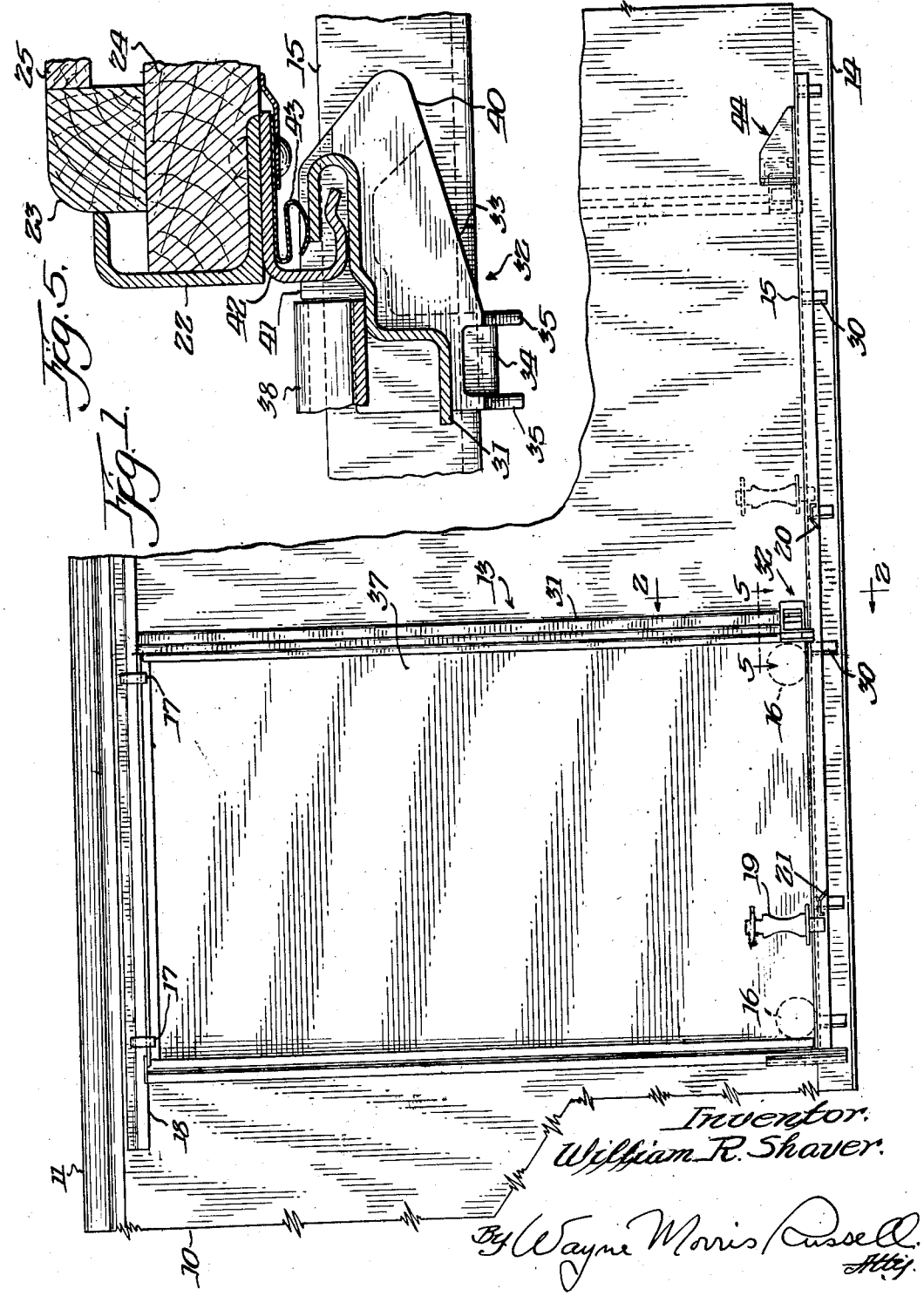
Fig. 1 is a fragmentary side elevational view of a side of a freight car embodying the invention.

It is to be noted that although the invention is shown and described in one embodiment, it is not to be limited thereby, and that alterations may be had with respect to the particular exemplification without varying the spirit and scope of the objects of this invention as defined in the appended claims.

Referring to the drawings, a side of a railway freight car is depicted having side sheets 10 secured at the top to a side plate 11 and at the bottom to a side sill 12, which latter part is reinforced adjacent a sliding door assembly 13 by a reinforcement 14. The door 13 is supported in the usual way on a door track 15, rolling or sliding thereon by means of rollers 16 (in phantom), and held at the top in a vertical position by hangers 17 which slide adjacent a retainer strip 18.

A well known latch mechanism 19, attached to the door, and open and closed door latch stops 20 and 21 are supplied for securing the door at either open or closed position. A door post 22 (Fig. 5) is provided on each side of the door opening which supports a furring strip 23 and support member 24 for the car wall lining 25. A floor sealer 26 (Fig. 2) separates the flooring 27 from the side sill 12. An intermediate post 28 (Fig. 4) also supports a furring strip 29 for the lining 25. The door track 15 (Fig. 2) is supported by a series of gusset-like plates 30 secured to the reinforcement 14.

Figure 2:
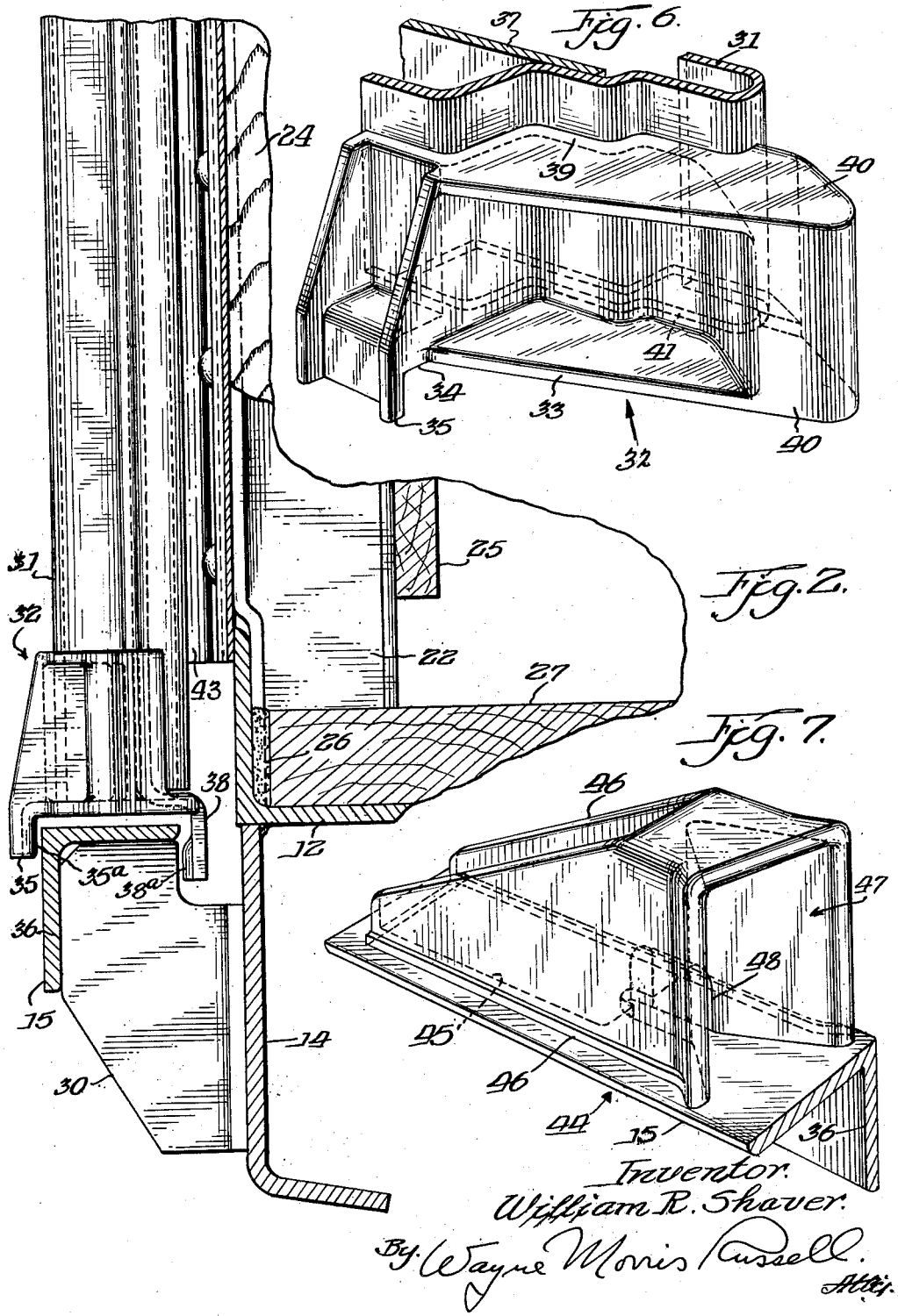
Fig. 2 is a sectional view on the line 2—2 of Fig. 1.
Figure 3:
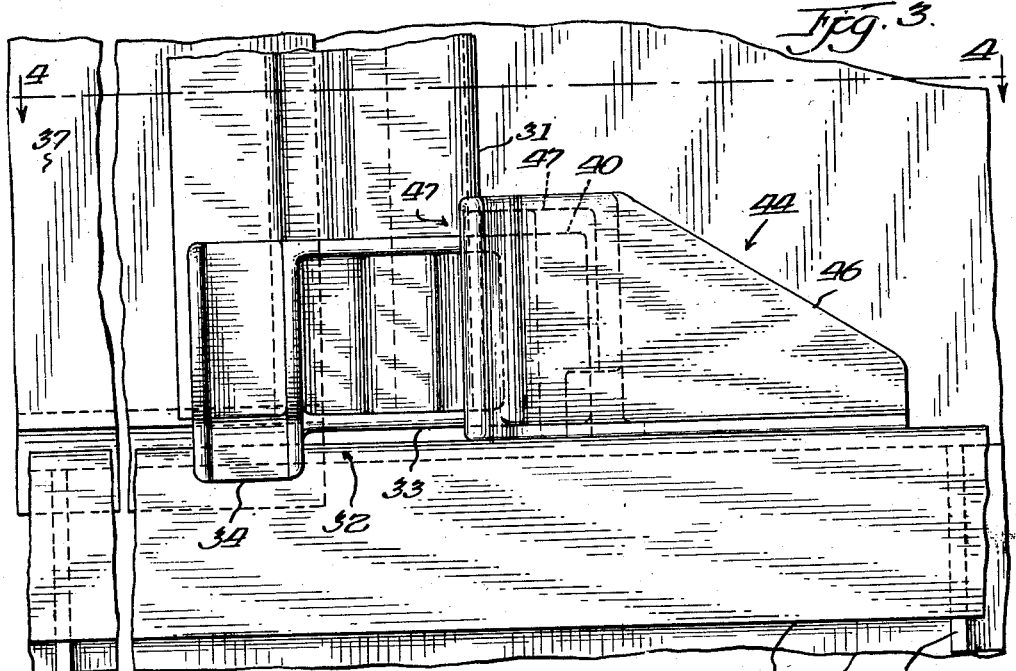
Fig. 3 is an enlarged fragmentary broken view of the bumper and guide unit, taken from Fig. 1.
Figure 4:
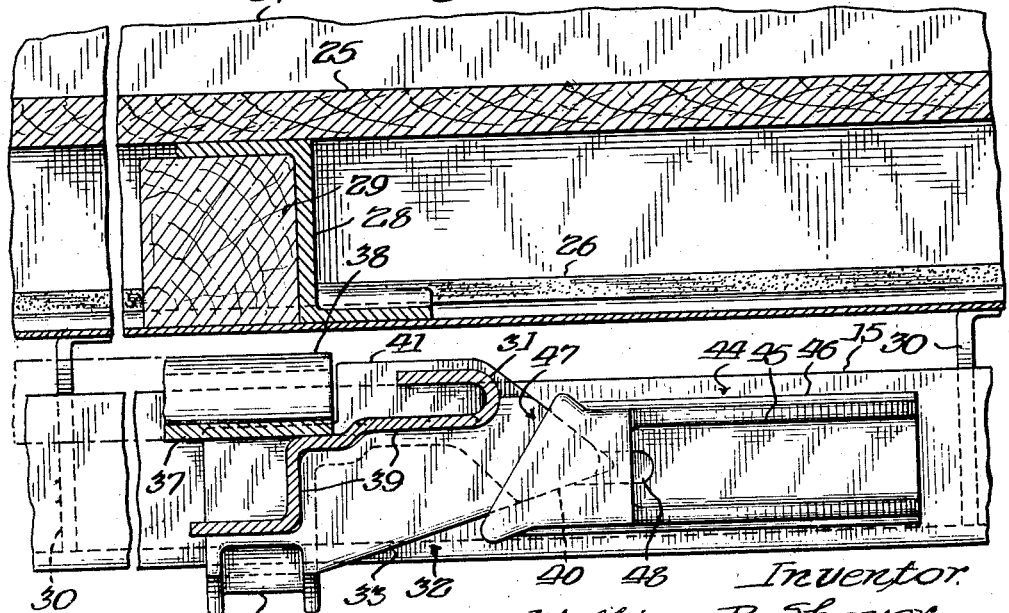
Fig. 4 is a sectional view on the line 4—4 of Fig. 3.

At the base of a door rear edge strip 31, a bumper and guide unit 32 is secured thereto, as by welding. The integral unit 32 (Fig. 6) is comprised of a flat horizontally disposed triangular shaped base piece 33 which has a right angular seat-like projection 34 on the outer edge, the legs 35 of which depend adjacent to the depending leg 36 of the door track 15 thus forming a guide (Fig. 2). A door sheet 37 which extends the entire width of the door 13, and to which at its rear edge the rear edge strip 31 is secured, has a flange 38 at the base (Fig. 2) on the inside of the door track 15 thus forming with the bumper and guide unit legs 35 a complete guide for the door on the track. Both guides 35 and 38 are rounded on their inner surfaces 35a and 38a to eliminate drag. The inner portion of the unit 32 extending upward from the base 33 has a facing 39 complementary with the outer face of the door rear edge 31. A wedge-like nose 40 at the end of the base 33 opposite the seat end extends but a short distance on the inner side of the unit, where only an inner flanged extension 41 from the base and in the same plane therewith remains (Fig. 4). When the door is closed (Fig. 5), a closing or spark strip 42, which with a weather strip 43 is secured to the door post 22, extends into a recess formed by the door rear edge strip 31. As the extension 41 from the bumper and guide unit 32, which is attached to the edge strip 31, rests immediately under the base of the spark strip, any tendency of the door 13 to vibrate while closed is thereby prevented, as the spark strip limits vertical movement of the extension 41.

Upon opening the door 13, a backstop 44, which is properly spaced from the door and which is secured to the track 15 (Fig. 1), engages the bumper and guide unit 32 and prevents further movement of the door. The backstop 44 has a flat base 45 with winged sides 46 terminating in a projection 47. The projection 47 has a jaw-like wedge-shaped opening therein. Thus when the door 13 is opened, the bumper nose 40 is inserted in a complementary manner within the opening in the projection 47 and any attempted vibration of the door is limited by the bumper unit 32 being enclosed within the stationary backstop 44. The upper portion of the opening in the projection 47 is defined by a horizontal wall and the bumper nose 40 engages the wall to limit upward vertical movement of the door 13. A channeled opening 48 is provided at the rear of the projection 47 and in the base 45 through which foreign material may be pushed by the bumper nose 40 in order to keep the opening in the projection free of such material. Also, as the backstop is located longitudinally centrally of the track, the wedge shaped nose 40 of the unit 32 centers the door so that upon beginning to close the door from an open position, an easier start may be had due to the door being centered on the track.

In the summation, it may be seen that an improved and unique bumper and guide unit has been conceived which not only limits the vibration tendencies of the door in both open and closed positions, but also centers the door when it is open, thereby aiding the initial closing sliding motion.

What is claimed is:

1. In combination with a railway car having a side wall and an opening therein, a horizontally disposed elongated member fixed under and extending away from said opening, a vertically disposed elongated element fixed to said car side wall at one edge of said opening, a door slidably attached at the top to said car side wall and at the bottom to said member and having a closed position over said opening and an open position away from said opening, a backstop fixedly secured to said member centrally of the width of the member and having an opening toward said door and being engageable with said door when in the open position, and an anti-movement means attached to said door adjacent said member, said means comprising a base, a wedge-like portion upstanding from said base, and a flange extending from said base toward said side wall, said flange underlying and engaging said element when said door is in closed position and said wedge-like portion extending into the opening in said backstop when said door is in open position.

2. In combination with a railway car having a side wall and an opening therein, a door over said opening and movably attached to said car side wall for shifting to a position away from said opening, a track directly under said door and providing support for said door, a stop member fixedly secured to said track centrally of the width thereof and spaced from said door and having a jaw-like wedge-shaped opening facing said door, and means fixedly secured to said door comprising a base, legs depending from said base and being laterally adjacent said track for guiding purposes, and a portion upstanding from said base and having a face complementary to said stop member opening and engageable therein when said door is in open position thereby limiting door vibration and centering said door over said track.

3. In combination with a railway car having a side wall and an opening therein, a door movably attached to said side wall and having a closed position over said opening and an open position away from said opening, a member longitudinally spaced from said door for stopping said door when in open position and having an opening therein facing said door and the upper portion of the opening being defined by a horizontal wall, and a projection on said door disposed in said member opening when said door is in open position and being engageable with the wall to limit upward vertical movement of said door.

4. In combination with a railway car having a side wall and an opening therein, a vertically disposed U-shaped strip having an inner leg thereof secured to said side wall adjacent said opening and extending substantially the entire height thereof, a slidable door attached to said side wall extending over said opening and having an edge adjacent said strip, and an anti-movement member secured to the base of said door edge, said member comprising a base, an upstanding wedge-like projection, and a flange extending from said base toward said car side wall, said flange immediately underlying an outer leg of said strip thereby limiting upward vertical movement of said door.

5. In combination with a railway car having a side wall and an opening therein, a vertically disposed U-shaped strip secured to said car side wall adjacent said opening, a movable door attached to said car side wall over said opening and having an edge adjacent said strip, and an anti-movement means secured to said door adjacent said edge, a horizontally disposed flange extending from said means in underlying juxtaposition with said side strip thereby limiting upward vertical movement of said door.

6. In combination with a railway car having a side wall and an opening therein, closing means secured to said side wall adjacent said opening, a door secured to said side wall and extending over said opening and having an edge adjacent said closing means, and an anti-movement means secured to said door edge in underlying juxtaposition with said closing means thereby limiting movement of said door.

7. A railway car sliding door bumper and guide unit comprising a V-shaped base, a seat-like projection on one side of said base and having legs depending below the plane of said base, an upstanding solid nose-like projection at the front of said base, and an extended flange on the opposite side of said base and being in the same plane with said base.

8. A railway car sliding door bumper and guide unit comprising a triangular-shaped base, a projection on one rear side of said base and having legs depending below the plane of said base, a snub-nosed projection upstanding from said base, and a flat flange extending away from said base on a rear side opposite the first named projection.

9. In a railway car having a side wall, an opening in said side wall, a slidable door having a closed position over said opening and an open position away from said opening, a track on which said door slides secured to the side wall, a backstop spaced from said door at least the width of said door when closed secured to the track and provided with an opening, a bumper and guide unit secured to the door and comprising a base adjacently overlying said track, guide means depending from said base and engaging one side edge of said track, flange means extending from said base and underlying and engaging a portion of said side wall when said door is in closed position, and a solid projection upstanding from said base and being insertable within the opening in the backstop when said door is in open position.

10. In combination with a railway car having a side wall and an opening therein, a vertically disposed strip secured to said car side wall adjacent said opening, a movable door attached to said car side wall over said opening, a horizontal wall disposed at the lower edge of said door adjacent the rear edge thereof and secured to the door, the second named wall being disposed below the strip and engaging the strip to limit upward vertical movement of said door when the door is in closed position.

References Cited in the file of this patent

UNITED STATES PATENTS

| 356,307 | Ferguson | Jan. 18, 1887 |
| 1,521,816 | Jager | Jan. 6, 1925 |
| 2,041,007 | Madland | May 19, 1936 |

FOREIGN PATENTS

| 24,694 | Great Britain | Apr. 30, 1903 |